INVENTORS.
YU CHI HO
BY EWELL CALVIN JOHNSON
JOHN LACHLAN McKELVIE

ATTORNEY

United States Patent Office 3,128,374
Patented Apr. 7, 1964

3,128,374
CONTROL SYSTEM
Yu Chi Ho, Boston, Mass., and Ewell Calvin Johnson and John Lachlan McKelvie, Royal Oak, Mich., assignors to The Bendix Corporation, Southfield, Mich., a corporation of Delaware
Filed Dec. 8, 1959, Ser. No. 74,687
18 Claims. (Cl. 235—151)

This invention relates to an electronic position control system and more particularly to a programmed, digital contouring control system for machine tools.

Electronic systems which receive numerical data and act to control the position of an output device in accordance with that data are well known. Such systems are commonly used to control the motion of the operating parts of machine tools through continuous paths in order to produce parts which are represented by the numerical data provided to the system. In one type the numerical data is introduced to the control system in the form of punched or magnetic tape. The first unit of the system, termed the controller, generates a series of electrical pulses of uniform amplitude and length at various intervals in accordance with instructions contained on the tape. These pulses are then introduced into the second unit of the system, a servo-mechanism which produces a discrete movement of a mechanical output device, such as a machine tool lead screw, for each pulse which is received. The number of pulses received by the servo-mechanism determines the total distance through which the cutting head moves, while the rate of pulse introduction determines the rate of cutting head movement. The tape may carry several information channels, each of which acts through a separate servo-mechanism to control the motion of the machine part along a different axis. The resultant movement of the cutting head or controlled part is the algebraic sum of the component movements as generated by the various servo-mechanisms.

Alternatively, rather than being fed directly to the servo-mechanism, the pulse output of the controller may be recorded on punched or magnetic tape for subsequent use in connection with the servo-mechanism.

In such systems of this general nature, the numerical information contained on the tape which is introduced to the control system commonly takes the form of the distances between a series of points measured along chosen coordinates. The control system then operates to move the part through a series of straight lines connecting these points. Alternatively, the information may represent the coordinates of the end points of a curve such as a circle with respect to its center. Then the control system must direct the servo-mechanism so as to generate this curve between these end points.

The present invention relates to a system of this type. One aspect of the novelty of the present invention lies in the method in which the numerical data which is introduced to the system is operated on by the controller to provide a series of output pulses which are so timed with respect to one another that the servo-mechanisms associated with the system move in the directions commanded by the data at rates commanded by the data. The present invention also presents novel aspects in the manner in which the pulse producing unit combines with the data preparation unit and servo-mechanisms, in the manner in which the numerical data may be presented to the pulse producing unit, and in the form that the numerical data takes.

In a preferred embodiment of the invention, which will be subsequently described in detail, the information is introduced to the control system on a punched tape containing lines of binary-coded-decimal information. This information includes coordinate distances between successive points on a path to be described, the nature of a path, i.e., circular or straight, and the rate at which the part is to be cut.

The controller itself includes an adder and a number of serial recirculating delay line registers and static registers. The information from the tape is first converted to straight binary form by a series of operations involving the adder. The information relating to the coordinates of the end points of motion and the feed rate are then admitted to various of the recirculating registers and the information relating to the nature of the line between the end points is admitted to a static electronic register. The information is retained in this position until the control unit has completely utilized the previous information which was fed to it. The newly admitted information is then advanced to other recirculating and static registers wherein it is operative with respect to the active circuitry.

At this point, for a block of information representing a straight line cut, the number indicating the desired feed rate is repeatedly added into a section of one of the other delay line registers which was initially empty. Each time the contents of this latter register overflow (no more than once for each addition), a command signal is generated which actuates the control to add the coordinate distances of the end points of the desired motion into another section of this recirculating delay line register which was also initially empty. These coordinate distances for linear motion will hereinafter be termed linear command numbers. Since the rate of overflow of the feed rate addition product from its register section is dependent upon the magnitude of the feed rate number, the additions of the linear command numbers occur at rates which are a function of the feed rate number.

These "overflow" or "carry" pulses may be simply defined as "1's" which are generated from the most significant stage of the register and would be carried to the next higher stage if there were one. Similarly, the overflows of the register section into which the coordinate numbers are repeatedly added are utilized to generate the pulses which drive the servo-mechanisms. In the preferred embodiment described, the machine tool is controlled over three axes simultaneously and, therefore, three command numbers are repeatedly added to themselves. The rates of overflow from these product register sections bear the same ratios to one another as do the command numbers, so that three trains of pulses are developed, each having a rate of pulse occurrence proportional to the length of the path which must be covered to reach the end point along the axis it controls since the three command numbers bear this ratio to one another.

Since the rate of production of pulses in the three trains is proportional to the total distance which the tool must be moved along each of the three coordinates, and each pulse represents an incremental motion along a coordinate, a sufficient number of pulses to produce the necessary total movement dictated by the command numbers will have been produced for all three axes at the same time. Means are therefore provided in the controller for determining when a sufficient number of pulses has been generated along all three axes to accomplish the commanded motion. This means makes use of the fact that when a binary number of "$n$" digits is added to itself $2^n$ times, a number of carry "1's" equal to the number itself will have been generated from the most significant digit of the number during the addition process and at that time the first "$n$" least significant digits of the number will be 0. If the number added to itself is odd (having a "1" as its least significant digit) rather than even, this will be the first time in the addition process that these digits are all 0's simultaneously. Accordingly, means are provided in the circuitry to insure that the numbers representing the distance motions are odd rather than even, and the addition process is terminated when 0's are detected in the first "$n$" digits of the number. At this point, the next block of information is introduced to the active portion of the circuitry and the process is repeated.

When the line to be generated is a circle rather than a straight line, the feed rate number is again repeatedly added to an initially empty register section in order to generate a series of add signals which occur at a rate which is a function of the feed rate number. The first of these add signals actuates the control to add the coordinates of the beginning point of the circular cut into initially empty sections of one of the delay line registers. In order to accomplish the constant change of slope which characterizes a circle, it is necessary that the rate of overflow of pulses from these product registers occur at sinusoidally varying rates. This is accomplished by modifying the numbers representing the initial coordinates of the circle cut each time an overflow pulse is produced from the registers to which these numbers are added into by adding or subtracting a "1" from each of them. When a "1" is added to an initial coordinate number, it causes the overflow pulses to be generated proportionally faster; while subtracting a "1" causes the overflows to be produced proportionally slower. These modified initial coordinates then represent the coordinates of the radius vector of the point of the circle being generated at any given instant. Means are provided for detecting when either of the coordinate numbers is reduced to 0. This is the equivalent of passing from one quadrant of the circle into the next and at that point the control acts to reverse the addition and subtracion process which is controlled in accordance with the basics of analytic geometry. The modified coordinates of the initial points of the circle are continually compared with the coordinates of the end points, and when both coordinates are equal, the cutting process is terminated. It should be noted that in order to obtain a proper rate of pulse production, the overflows of the register which receives the X addition product are fed to the Y axis servo-mechanism and vice versa. The preferred embodiment of the invention makes a circular cut in two dimensions only.

The pulses which represent the overflows of the various coordinate addition registers for both linear and circular cuts are either channeled directly to the servo-mechanisms or to a circuit which acts to provide an output equal to an integral multiple of the number of pulses it receives in order to achieve a faster motion along the controlled axes without excessively burdening the previous digital circuitry with high pulse rates.

It is, therefore, an object of the present invention to provide a digital control system which accepts data in numerical form and provides position control over the cutting tool of a machine in accordance with orders contained in numerical data.

Another object is to provide a device which accepts numerical data in coded form and which provides a pulse train as its output; the number and timing of the pulses being varied in accordance with the information contained in the input data.

A further object is to provide a unit which produces pulse trains in accordance with numerical data which utilize recirculating delay line registers, whereby the economies of such devices may be utilized in continuous position control systems.

Another object is to provide a continuous position control system which will control the speed of several axes in such a manner as to make the resultant movement of a tool along such axes occur at specified rates.

A still further object is to provide means for generating a plurality of trains of pulses at rates which vary in accordance with particular number contained in the numerical data introduced into the system.

A further object is to provide a numerical control system wherein either linear or circular cuts may be provided as commanded by the control data.

Other objects, advantages and applications of the present invention will be made apparent by the following detailed description of a preferred embodiment of the invention. The description makes reference to the accompanying drawings in which.

Electronic Position Control System

The structure and operation of the preferred embodiment of a control employing the present invention will be described in a general, functional manner. It should be understood that the preparation of specific digital circuitry for performing the functions which will be ascribed to the various units of the block diagram is within the ability of those skilled in the digital control art. The present invention thus lies in the systemic arrangements of units for performing certain functions and the nature of the functions which are thus performed.

Tape Formate

Figure 2:
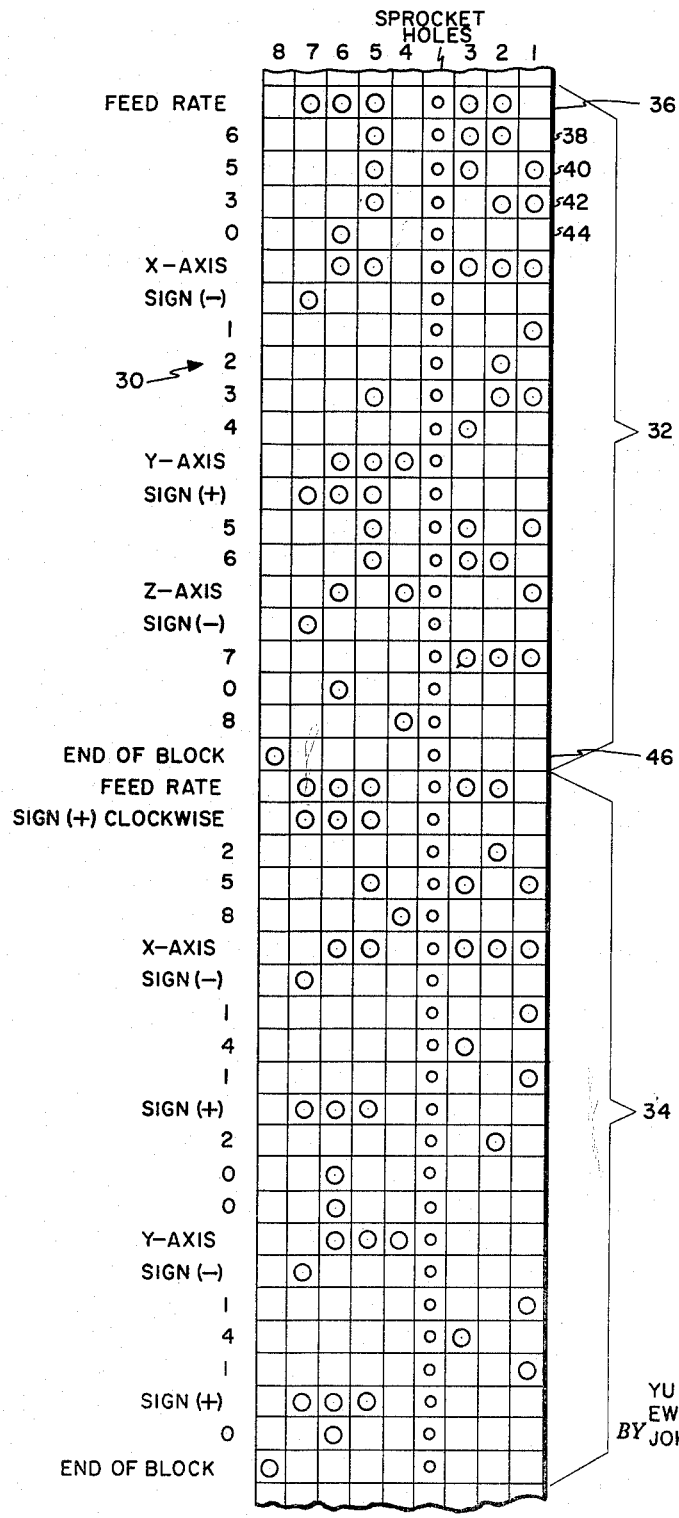
FIGURE 2 represents a section of tape used in connection with the control.

A section of tape which is used to control the system to be described is illustrated in FIGURE 2 and generally indicated at 30. The section illustrated contains two blocks of information, the first of which, 32, contains complete instructions for the machine to cut a straight line between two three-dimensional end points. A second block of information 34 contains instructions for the machine to cut a circular arc between two-dimensional end points.

Such a tape may be prepared on a typewriter-like device having a key representing each number or instruction to be coded on the tape. A machine of this type is commercially available under the trademark "Flexo-Writer" and is manufactured by the Friden Calculating Machine Co. of San Leandro, California.

The tape has eight longitudinal columns or channels and an entire transverse line comprising one symbol from each of the channels is read at a given time.

In the following description, the channels will be referred to with reference to their position in respect to the right edge of the tape. A punch mark in any of the eight data channels signifies a binary "1" while the absence of a punch mark indicates a binary "0."

A particular combination of 1's and 0's on a transverse line may indicate the nature of the information contained on following lines, such as the required command number or distance motion along either the X, Y or Z axes or the feed rate at which a particular motion is to be executed or the sign or direction of a particular motion. Or, a line may represent one decimal digit in one of the numbers.

In block 32, the information punched in line 36 indicates that the lines immediately following contain the feed rate number indicating the speed at which a motion is to be executed. Thus, the presence of holes in the second, third, fifth, sixth, and seventh channels from the right edge of the tape will always indicate that the following information is a feed rate number. Lines 38, 40, 42 and 44 indicate that number, each line providing one of its decimal digits in binary-coded-decimal form. Thus, for the purposes of the code used, line 38 contains the number six, line 40 contains the number five, line 42 contains the number three, and line 44 indicates the numeral 0. Thus, the information in lines 36 through 44 indicate that the feed rate number is 6530.

In a similar fashion, the remaining lines in block 32 indicate the length of the movement along the X, Y and Z axes necessary to complete the straight line commanded by the block and the direction of that motion.

A block of information for linear interpolation preferably begins with the symbol for the address for the feed rate number followed by that number hereinafter referred to as FR. This is followed by the address for the length of the motion recorded on the X axis, then that number is given. The command numbers for the distances required along the Y and Z axes then follow. Each of these numbers, except FR, is preceded by a code for its sign, either positive or negative.

The command numbers indicating the required motion along the X, Y, and Z axes will hereafter be termed $D_x$, $D_y$, and $D_z$ and will be referred to as the linear command numbers.

A block of information for circular interpolation may also begin with the address for a feed rate number followed by that number. This feed rate number is prefixed by a plus or minus sign which indicates whether the block is in a clockwise or counterclockwise direction. Next, the block of circular information contains the address for X followed by the X-components of the initial and final radius vectors of the circle to be cut. Each of these numbers is also prefixed by a plus or minus sign to indicate which quadrant it occupies. The Y address is then given followed by the Y-components of the initial and final radius vectors and their signs. The initial components of the radius vectors will be hereafter termed $X_i$ and $Y_i$ and the final values will be denominated $X_f$ and $Y_f$.

Figure 1:
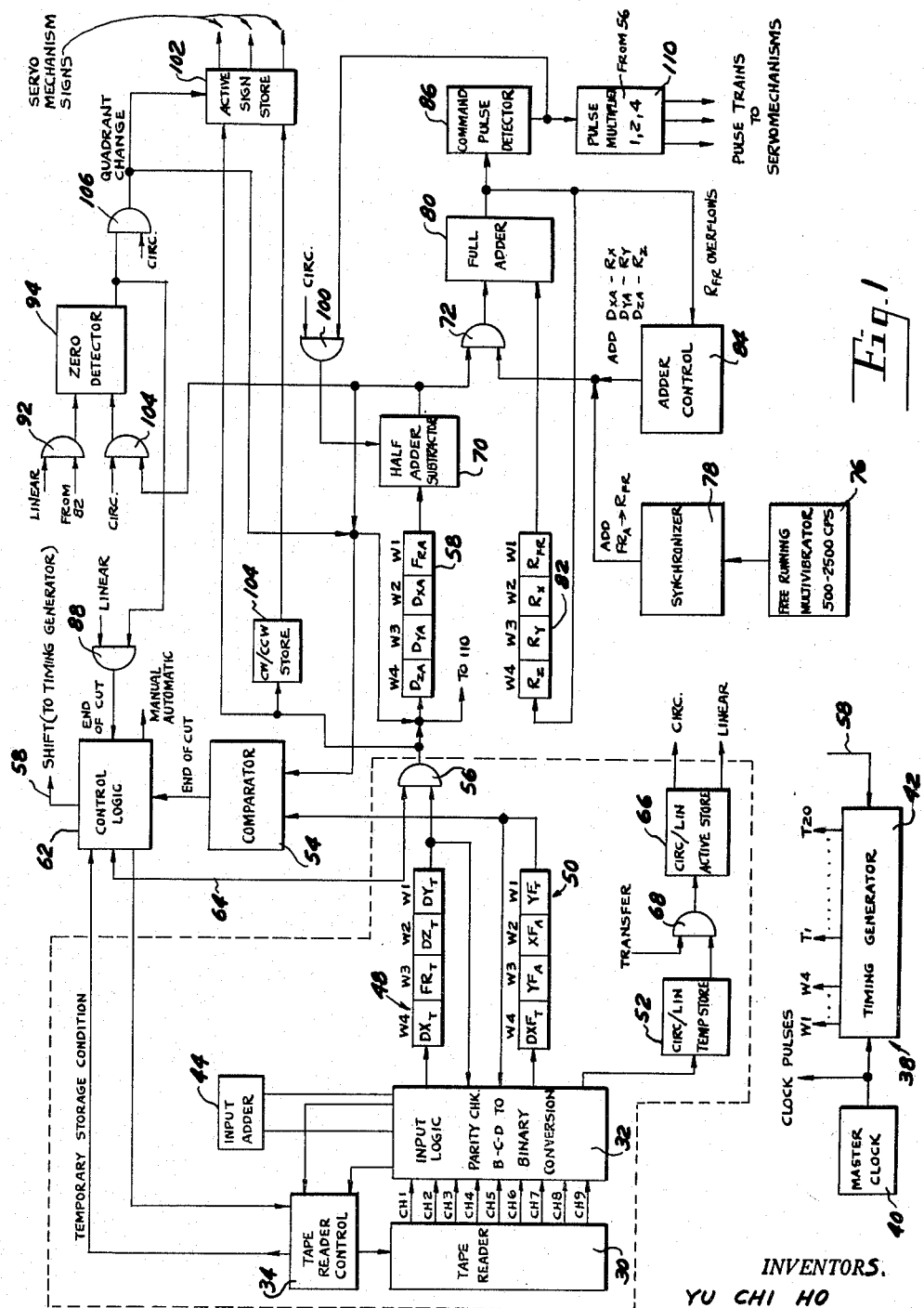
FIGURE 1 is a block diagram of a preferred embodiment of the invention.

The tape is sensed by a commercially available reader, indicated by the numeral 30 in FIGURE 1, which provides eight electrical outputs to an input logic section 32. These outputs represent the eight channels on a section of tape and the presence or absence of a particular voltage on any of the eight outputs represents the presence or absence of a hole or a binary "1," in the particular transverse line being scanned by the tape reader at that time.

The tape is advanced in the reader 30 so as to present the next transverse line for the reader's examination upon receiving a signal from the tape reader control 34. The control 34 is provided with a manual start and stop switch 36 which may be used to initiate and override the automatic controls.

The tape reader control 34 also has an input from the general control logic device which controls the advance of the tape and an input from the logic section 32. The line from the input logic section acts to halt the operation of the reader if a parity error is noted on the tape. Channel 5 of the tape is punched only when the number of other punches in a transverse line is even. The input logic section 32 includes circuitry for determining the total number of punches that the reader 30 senses in reading a transverse line. If the tape is correctly punched and the sensing head properly indicates the presence or absence of a punch, the number of punches, including the parity punch of channel 5, should be odd. If this is not the case, the signal is sent to the tape reader control 34 halting the operation of the reader so that the operator may inspect the device to determine the source of error.

*Timing Section*

All the units of the control operate in a particular order which is determined by a timing section 38. The section operates from a master clock 40 which constitutes a fixed frequency multivibrator. The clock provides "clock pulses" to all of the control circuitry. These pulses act as conditions precedent to all of the logical operations performed by the control. This is done by providing the occurrence of a clock pulse as the necessary condition for a change in the state of the flip-flops. In the detailed circuitry of the device, it is to be understood that all the flip-flops can only change state upon the occurrence of a clock pulse.

The clock pulses are provided to a timing generator 42 which indicates at what point in its predetermined repetitive cycle the control is in, and acts as a source of signals to actuate functions which should occur at such time.

The timing generator 42 broadly comprises an endless chain of 20 flip-flops connected so that successive elements in the chain change state on successive clock pulses. Thus, each element in the chain changes state once every 20th clock pulse. Each flip-flop provides an output when it changes state from the time when it changes state until the next elementary changes. These outputs are made available to the rest of the circuitry on 20 lines which are denoted T1, T2, T3, . . . T20.

The T20 pulse is utilized to provide a signal to another endless chain of four flip-flops. Thus, each one of the second chain of four flip-flops goes high once during the time in which four T20 pulses have been generated, or once every 80 clock pulses. The chain of four flip-flops provides outputs on one of four lines during the 20 clock pulses in which they are in a changed state. These outputs are provided on lines W1, W2, W3, and W4. The timing generator always provides outputs on one W line and on one T line. Any action in the associated control circuitry may be conditioned to occur at any particular time within a repetitive cycle of 80 pulses by using the appropriate W and T outputs as inputs to "and" gates which allow that action.

*Input Logic Section*

The input logic section 32 performs three functions: (1) the reception of data from the tape reader 30 and the checking of the parity of that data; (2) the conversion of the data from binary-coded-decimal form to binary form; and (3) the storage of the information in binary form.

The input logic section 32 has inputs from the eight tape reading heads as well as from the timing generator as does all of the other control circuitry. The parity check is performed by feeding the eight inputs to separate "and" gates, each of which has as its other input a different one of the timing signals so that they are opened in sequence. The outputs of these "and" gates are fed to a flip-flop which is reversed each time it receives an input. If a line across the tape has an odd number of punches, the flip-flop will always end up in a particular state. If it is in the incorrect state at the end of the parity determination, a signal is sent to the tape reader 34 halting operation of the control.

A second function of the input logic circuitry is to convert the information from the binary-coded-decimal form in which it is contained on the tape to a binary form suitable for use with the subsequent circuitry. It does this in connection with a serial binary input adder 44 which has input from the logic section 32 and provides output to the logic section.

Binary-coded-decimal numbers from the tape are converted to straight binary form in the following manner:

First, the sign of the number which immediately follows the address is read from the tape and stored in the proper position of a register as a "1" if the sign is negative, or a "0" if the sign is positive. This digit is not operated upon in the following processes.

The tape is coded so that the first decimal digit contained on the line following an address represents the number's most significant digit. The input logic section first reads this number from the tape and stores it. It then senses the absence or presence of a second decimal digit of the number. If this second digit is present, the input logic section multiplies the first digit by 10 by delaying it one clock pulse (the equivalent of a binary multiplication by 2), then delaying it by three clock pulses (the binary equivalent of a multiplication by 8), then adds these two products. It then adds the multiplied product to the second decimal digit. Next, the input logic section senses the presence of a third decimal digit on the tape. If this is present, the previous sum is again multiplied by 10 and added to this third digit. This process continues until all of the digits on the tape have been exhausted as is indicated by the occurrence of another address.

The preferred embodiment of the machine is designed to move in increments of .0002 inch. Each pulse which the control unit sends to the servo-mechanism thus represents .0002 inch of motion. In order to convert the number on the tape, which is in units of inches, carried to a precision of four places to the right of the decimal point and therefore always even, into units representing command pulses, it is necessary to divide the number by two. This is done by ignoring the least significant position of the number (which is always a zero) since it is an even binary number in the subsequent circuitry and thereby the number as if its zero position were shifted one point to the left. In order to identify this least significant position, a "1" is entered therein and termed the "marker pulse" since it is not treated as an actual digit by the subsequent circuitry. This also insures that the number will be odd so that this fact may be used to determine when a sufficient number of command pulses have been generated as will be subsequently noted.

When a particular motion instruction has been prepared for all three axes in this manner, the three numbers are then simultaneously shifted in their register until a "1" appears in the most significant bit position of the registers—not counting the sign bit position which is never shifted. Locating these command numbers in the most significant ends of the registers enables subsequent circuitry to operate in an efficient manner as will be described subsequently.

The following example illustrates the manner of conversion of the binary coded tape information to decimal form for the command numbers $X=-.0026$ and $$Y=+.0118$$

For the purposes of the example, it is assumed that the register contains only 10 bits.

The register which is to contain $D_x$ is:

1. Initially empty.              0 0 0 0 0 0 0 0 0 0
2. Read sign bit, (−), write a "1" in most significant bit position.    1 0 0 0 0 0 0 0 0 0
3. Read 2=010 into the register's leading end, least significant bit first.    1 0 0 0 0 0 0 0 1 0
4. Multiply by 10 (×10=×2+×8 delay 1 and 3 bit times and add).    1 0 0 0 0 0 0 1 0 0 = 4
                                                1 0 0 0 0 1 0 0 0 0 = 16
                                                1 0 0 0 0 1 0 1 0 0 = 20
5. Add 6=110.                   1 0 0 0 0 0 0 1 1 0 = 6
                                                1 0 0 0 0 1 1 0 1 0 = 26
6. Read and decode Y in similar fashion using the $D_y=$ register.    0 0 0 1 1 1 0 1 1 0 = +118 = Y
7. Insert marker pulses in least significant bit position of both numbers.   1 0 0 0 0 1 1 0 1 1 = X
                                                  0 0 0 1 1 1 0 1 1 1 = Y
8. Shift both numbers continuously until a "1" is located in the most significant number position neglecting the sign position.
         X = 1 0 0 1 1 0 1 1 0 0     Y = 0 1 1 1 0 1 1 1 0 0

When a block contains information for circular interpolation rather than linear interpolation, the X and Y components of the initial radius vector of the circle are handled in the same manner as are the command numbers above.

The feed rate number for both linear and circular interpolation is read in and converted to binary form in a similar manner; however, no marker pulse is written into the temporary feed storage register. This number is also not shifted in the register as are the X, Y, and Z command numbers.

The final function of the input logic circuitry is to store the command numbers in binary form. This is done in two serial recirculating sonic delay line registers 48 and 50 which are preferably of the magnostriction-wire type, and a static temporary storage register 52. The register 48 has as its duty to provide a temporary storage for the command numbers indicative of the total motion required along the X, Y, and Z axes (subsequently referred to as $D_x$, $D_y$, and $D_z$ numbers) for a linear cut, the numbers indicative of the initial coordinates of a circular cut ($X_i$ and $Y_i$) and the feed rate number (termed FR with an appropriate subscript) for both types of cuts. The lines 48 and 50 provide a delay of such length that pulses introduced to them at a given timing pulse emanate from their ends 80 timing pulses later. They thus retain four words of twenty characters each.

The input logic introduces the words to lines 48 and 50 in such an order that particular numerals emerge at particular times as indicated by the timing generator 42. The letters in the particular boxes on the registers 48 and 50 in FIGURE 1 indicate the normal order of emergence for a linear cut. $D_y$ emerges during W1 time, $D_z$ emerges during W2 time, FR during W3 time, and $D_x$ during W4 time. The recirculating register 50 stores the $X_f$ and the $Y_f$ numbers representing the end points of the circular cut for both temporary storage and active use. The $X_f$ and $Y_f$ numbers are respectively stored in word times 1 and 4 for use in temporary storage and at word times 3 and 2 for active storage. The input logic directs the converted numbers to the proper section of the registers 48 and 50 through use of the addresses, which are read from the tape and statically stored during the readout and processing of the number that they prefix.

The nature of the block, that is the circular or linear interpolation sign, is stored in the static flip-flop 52.

The input logic must thus accept an address or number from the tape reader, check its parity, store it if it is an address, or direct it to the register 48 or 50 at the appropraite point in the time cycle if it is a number after converting it from binary-coded-decimal form to binary form. The contents of both the delay lines 48 and 50 recirculate through the input logic section 32 in order to provide the logic section with continuous access to its contents.

Active Storage

As has been noted, the register 50 provides the active storage as well as temporary storage for the $X_f$ and $Y_f$ numbers. It provides output to a comparator 54 which makes use of the active $X_f$ and $Y_f$ numbers in a manner which will be subsequently described.

In addition to being fed back to the input logic section 32, the contents of the register 48 are fed to an "and" gate 56. This gate provides output to a third sonic delay line serial recirculating register 58 of 80 characters in length. This delay line performs the function of storing the active $D_x$, $D_y$, and $D_z$ numbers, and the FR number. As is indicated on FIGURE 1, these are stored with the FR number in W1 word time, the $D_y$ number in W3 word time, and the $D_z$ number in W4 word time. It is to be noted that this order differs from the order of storage in the register 48 in that each of the numbers is advanced (or delayed) by two word times. This change in storage is necessary for the following reasons:

During a circular cut, the $D_x$ and $D_y$ numbers in the active line are altered by one number each time they emerge from the line in such a manner that they at all times represent the desired position of a cutting head with respect to the center of the circle being generated. This will be subsequently described in greater detail. Since the circular cut is halted when the actual position has reached the $X_f$ and $Y_f$ numbers, it is necessary that the $X_f$ and $Y_f$ numbers contained in the register 50 emanate from that register during the same word times as do the $D_x$ and $D_y$ numbers so that the two may be compared to detect coincidence.

Therefore, in order to place $D_x$ and $D_y$ numbers in the register 58 in the proper sequence, the normal operation of the timing generator 42 is altered immediately after the transfer of the information from the register 48 to the register 58 through the gate 56. This alteration takes the form of skipping the W3 and W4 times in that particular cycle and going directly to the next W1 time.

Thereby, the number emerging from the register 48 during what was previously considered the W3 time is entered into the register 58 in what is then the W1 time. Simultaneously, the two numbers in the W1 and W4 time positions in the register 50 are transferred to the W3 and W2 time positions and are thereby placed in position for active storage.

The timing generator is controlled to perform this shift by line 60 which connects it to the control logic box 62. The same box 62 also provides a second input to the "and" gate 56 through a line 64, which allows the information from the register 48 to be transferred to the register 58. At the time of transfer, the information from the static circular-linear storage register 52 is transferred to an active circular-linear register 66 through an "and" gate 68.

*Feed Rate Determination*

The function of the active circuitry is to provide the pulse outputs to the servo-mechanisms in accordance with the criteria previously described. Whether the interpolation is linear or circular, the feed rate control operates in the same manner. The feed rate determination will be generally described first and the linear and circular interpolation will be described in turn.

The feed rate number, contained in binary form in register 58, emerges during W1 word time with its least significant bit first. The feed rate number passes through a half adder or subtracter 70 which does not affect it. The feed rate number then passes to an "and" gate 72 which has as its second input the output of an "and" gate 74. The "and" gate 74 is conditioned by the W1 time signal and a signal from a free-running multivibrator 76. The free-running multivibrator is manually adjustable in output frequency and is used to broadly control the rate at which the circuit operates. Its setting acts as a multiplier for the feed rate number. The output of the multivibrator 76 is synchronized with the time of pulse occurrence of the other circuitry as determined by the master clock 40 in a synchronizer unit 78 which provides output to the "and" gate 74. When the synchronizer provides an output pulse, the "and" gate 74 provides an output at the following W1 time and thereby conditions the "and" gate 72 to pass the feed rate number.

The "and" gate 72 has output to a full adder 80 which, in addition to receiving the output of the register 58, receives the output of a fourth serial recirculating delay line register 82 of 80 bits in length. The register 82 is empty at the beginning of an active cycle. One of the functions of the adder is to add the feed rate number into the first word space of the register 82 with the least significant digit of the feed rate number being added to the least significant position of the W1 word space in the register 82. During each W1 word time, the feed rate number is added into the W1 space in the register 82. Overflow from the register 82 is detected by sensing the condition of the carry flip-flop of the adder 80 at an appropriate point in the word time. The particular point is dependent upon the length of the feed rate number. If it contains 10 bits or less, overflow is detected by inspecting the carry flip-flop and the full adder at T11; if 11 bits at T12; if 12 bits at T13; and if 13 bits (maximum coded length) at T14. This technique is used in connection with variations in the operation of the subsequent pulse multiplier circuit in a manner that will be described.

Each time an overflow pulse occurs, it is fed to an adder control 84 which operates to condition the second input of the "and" gate 72 through the following W2, W3, and W4 word times. This allows the adder 80 to operate on the numbers contained in the W2, W3, and W4 times in the register 58 whether they be the $D_x$, $D_y$, and $D_z$ command numbers for linear interpolation or the $X_1$ and $Y_1$ numbers for circular interpolation.

*Linear Interpolation*

In linear interpolation, the numbers $D_x$, $D_y$, and $D_z$ are maintained in the W2, W3, and W4 spaces in the register 58. As they pass out of the register 58, they are fed through the half adder or subtracter 70, which is only operative to modify the number during circular interpolation, to the "and" gate 72. If an overflow from the W1 word space of register 82 has occurred immediately previously, the "and" gate 72 is conditioned and allows linear command numbers to pass to the full adder 80. There $D_x$ is added into the W2 word space of register 82, $D_y$ is added into the W3 word space of register 82, and $D_z$ is added into the W4 word space of register 82. In FIGURE 1, the contents of the four word spaces of register 82 have been indicated as RFR (resultant feed rate), $R_x$, $R_y$, and $R_z$.

The carry products which occur at W2 T20, W3 T20, and W4 T20 again represent the overflows of the three spaces in the register and these pulses are fed to a command pulse detector 82.

Since the three registers overflow in the same ratio as the three command numbers bear to one another, the pulses are produced at the output of the command pulse detetcor 82 at the W2, W3, and W4 word times in the ratio of the three numbers to one another. Thus, the first condition of the interpolator is satisfied.

The other requirement of the interpolator is that it terminate the pulse production when the number of pulses in each of the three pulse trains is equal to the command number. As the rate of pulse production in the three trains is in the ratio of the command numbers, it should be noted that this condition should occur approximately at the same time for all three pulse trains.

It is a characteristic of the binary number system that when a given number of "n" bits length is added to itself $2^n$ times, a number of carries will be generated from the most significant digit of the number which is equal to the number itself. For example, if the binary number $101 = 5$ is added to itself $2^3$ times, a total of five carries from the third significant position will be generated. Therefore, in order to generate a sufficient number of command pulses from a series of three command numbers, it is necessary to perform a number of additions equal to $2^n$, where "n" equals the number of significant digits in the longest of the three numbers.

As has been noted, the three numbers are stored with their least significant digits (marker pulse) in the same time position in each word and with the most significant digit of the largest of the three numbers in the next to the last bit position (T19). Also, each of the three numbers carries a marker pulse as a substitute for its least significant digit.

The occurrence of a number of additions into the register 82 sufficient to generate a number of command pulses equal to the command numbers is determined by observing the contents of the W2, W3, and W4 word time spaces of the register 82. When a sufficient number of additions have occurred, the contents of each of these word spaces in the register 82 will be zero since a binary number of "n" significant digits when multiplied by $2^n$ provides a product in which the first "n" significant figures are zeros. Since the least significant bit of the number is a "1" (marker pulse), the product will have zeros in the first "n" significant places *only* after $2^n$ multiplications.

Since the marker bit is not considered to be an actual part of the number, the true zero condition occurs when a "1" occurs in the most significant bit position (T19) preceded by zeros in all other bit positions. Under certain circumstances, the zero condition may occur when this marker "1" is in a lower bit position followed by all zeros as will be detailed in the subsequent description of the pulse multiplier circuitry.

The occurrence of this zero condition is sensed by a zero detector 84 which has input from an "and" gate 86. The gate 86 has inputs from the register 82 and the "linear" output of the active storage register 66. When the zero condition occurs, the zero detector provides an output pulse to an "and" gate 88 which has the "linear" signal as its other input. This provides an end-of-cut signal to the control logic section 62. A specific example will aid in visualizing the operation of the zero detector 84 in terminating the addition of the contents of the register 58 to the register 82.

Assume $D_x = -12 = 1\ 1\ 1\ 0\ 1\ 0\ 0\ 0\ 0\ 0$ (in a ten-bit register) in converted form. There will then be a "1" in some position short of the most significant in the register 82 until $2^4 = 16$ additions have been made into it:

```
 1. 1 1 1 0 1 0 0 0 0 0   Overflow
 2. 1 1 0 1 0 0 0 0 0 0   ✓
 3. 1 0 1 1 1 0 0 0 0 0
 4. 1 0 1 0 0 0 0 0 0 0   ✓
 5. 1 0 0 0 1 0 0 0 0 0
 6. 1 1 1 1 0 0 0 0 0 0
 7. 1 1 0 1 1 0 0 0 0 0   ✓
 8. 1 1 0 0 0 0 0 0 0 0
 9. 1 0 1 0 1 0 0 0 0 0   ✓
10. 1 0 0 1 0 0 0 0 0 0
11. 1 1 1 1 1 0 0 0 0 0
12. 1 1 1 0 0 0 0 0 0 0   ✓
13. 1 1 0 0 1 0 0 0 0 0
14. 1 0 1 1 0 0 0 0 0 0   ✓
15. 1 0 0 1 1 0 0 0 0 0
16. 1 0 0 0 0 0 0 0 0 0   ✓
```

*Circular Interpolation*

Figure 3:
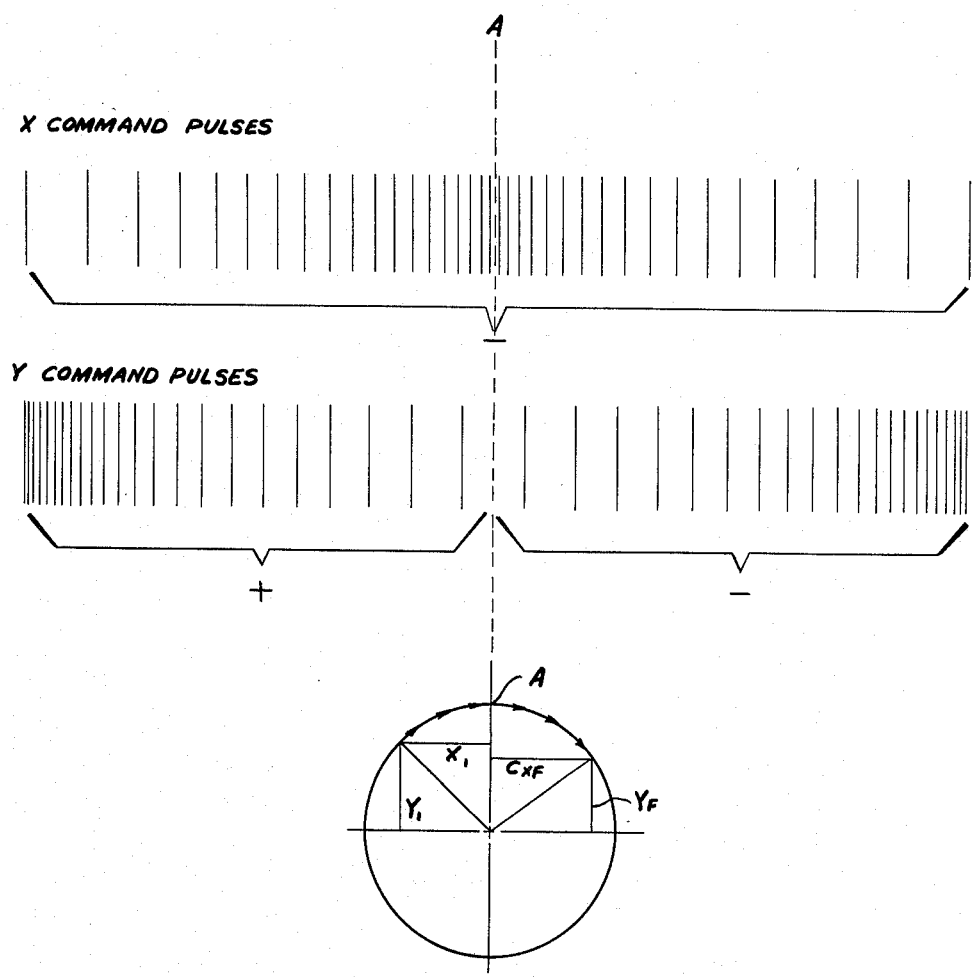
FIGURE 3 represents a schematic drawing relating to the operation of the circular interpolation mode of the control.

In circular interpolation, which may only be achieved by the preferred embodiment of the present system in two axes, the X and Y servo-mechanisms must be supplied with streams of pulses which are not uniformly spaced in time as in linear interpolation but which vary at sinusoidal rates. It should be noted that at the same time one train is achieving its maximum pulse rate, the other train is experiencing a minimum pulse rate; that is, the pulse rates of the two trains vary in accordance with sine and cosine functions. FIGURE 3 illustrates hypothetical X and Y command pulse trains which are generated for a circular cut beginning at a point in the second quadrant $(-X_i, +Y_i)$ and proceeding in a clockwise direction into a point in the first quadrant $(+X_f, +Y_f)$. First, it should be noted that the necessary pulse rate at any point in the train is inversely proportional to the appropriate coordinate of the radius vector at that point. That is, as the cut proceeds toward the point A where the X coordinate is zero, the X pulse rate must increase as the primary component of the motion is in the X direction. Similarly, as point A is approached, the Y pulse rate becomes minimal although the Y coordinate of the radius vector is at its maximum.

In the generation of a straight line cut, the command pulse trains were generated by adding a constant quantity repeatedly into an initially empty register and using the overflows of that register to actuate command pulses. In order to obtain varying rates of pulses in the command trains for circular interpolation, it is necessary to vary the numbers which are repeatedly added into the initially empty register during the addition process. This is achieved by considering the numbers which are added into the register to be the equivalents of the coordinates of a radius vector. As the cut proceeds, these numbers are varied in the same manner that the radius vector varies. Thus, $X_i$ and $Y_i$, which are the coordinates of the initial radius vector, are first added into an initially empty section of a recirculating register. Each time an overflow occurs and a command pulse is generated, $X_i$ or $Y_i$ is modified by adding or subtracting a "1" from it in order that it will continually represent the coordinates of the radius vector at the point at which the cut is being made. Thus, in the example of FIGURE 3, at the beginning of the cut each time an overflow occurs from the register which $X_i$ is being added into, the $Y_i$ quantity is increased by "1" since the $Y_i$ component of the radius vector is increasing. Similarly, at the beginning of the cut illustrated in FIGURE 3, each overflow from the register section which $Y_i$ is being added into actuates a circuit which decreases the $X_i$ quantity by "1." When point A is reached, this action must be reversed and the $X_i$ quantity must be increased by "1" each time an overflow occurs while the $Y_i$ quantity must be decreased by "1."

Since the X command pulse train must have a maximum pulse rate when $X_i$ is large and a minimum pulse rate when $X_i$ is small, and the Y command pulse rate must bear the same relation to $Y_i$, the output of the register in which $X_i$ is being added is used to generate the Y command train while the overflows of the register in which $Y_i$ is being added is used to generate the X command pulse train. This is in accordance with the mathematical concept that the slope of a circle is the negative reciprocal of the radius vector.

With reference to FIGURE 3, if motion to the right is considered to be in a positive direction for the X servo-mechanism and motion in an upward direction is taken to be a positive direction for the Y servo-mechanism, then the direction of the X servo-mechanism must change as $Y_i$ goes through 0 and the direction of the Y servo-mechanism must change as $X_i$ goes through 0. The servo-mechanism incorporates mechanism for selecting the appropriate direction upon receipt of the signal from the controller circuitry.

In circular interpolation, the numbers $X_i$ and $Y_i$ are maintained in the W2 and W3 spaces in register 58 and the feed rate number, FR, is maintained in the W1 space of that register. As the numbers pass out of the register 58, they are fed through the half adder or subtracter 70, which is initially inactive and only operates upon the number after the first command pulses are generated by the number. The numbers then pass through the gates 71 to the full adder 80 where the numbers $X_i$ and $Y_i$ are added into the W2 and W3 word spaces of the register 82 if an overflow has occurred in the W1 space as a result of the addition of the number FR into the W1 word space of the register 82 in the same manner as was described for linear interpolation. The overflows of the W2 and W3 word space register 82 are detected by the command pulse detector 86 in exactly the same manner as in linear interpolation and thereby generate command pulses along the appropriate axis. These command pulses are also fed back to an "and" gate 100 which has as its second input the "circular" output of the active storage register 66. The gate 100 provides the other input to the half adder or subtracter 70. When a command pulse is generated and circular interpolation is occurring, the half adder or subtracter 70 operates to either add or subtract a "1" from $X_i$ and $Y_i$ during their passage through it following the generation of a command pulse. The information for this action is supplied to the half adder or subtracter 70 from an active sign storage unit 102. This unit has inputs from a clockwise/counterclockwise storage unit 104, which has a connection to the output of the gate 56, and receives and stores the sign of the feed rate number associated with a block of circular interpolation which constitutes the clockwise/counterclockwise sign.

The storage unit 102 also has an input from the zero detector 84. During circular interpolation, the zero detector 84 receives the output of a gate 104 which senses the output of the half adder or subtracter 70. When the contents of either the W2 or W3 word spaces of the register 58 ($X_i$ and $Y_i$) are 0, following their passage through the half adder or subtracter 70, the detector 84 provides a signal through a gate 106 to the active sign storage unit 102. This signal operates to change the signs of either one of the two radius vector components represented by $X_i$ and $Y_i$ depending upon the direction of the circular cut and the previous sign of these two quantities. The sign storage unit 102 also has outputs to the X and Y servo-mechanisms. Each time one of the quantities $X_i$ or $Y_i$ becomes 0, the direction of motion of the opposite servo-mechanism must be reversed. Thus, when point A is reached in FIGURE 3, $X_i$ becomes 0 and the direction of the Y servo-mechanism must be reversed from positive to negative. In summary, the active sign storage register 102 must control the operation of the half adder or subtracter 70 to determine whether a pulse is either added or subtracted from the quantities $X_i$ and $F_i$ and also provide signs for the X and Y servo-mechanisms. This is done on the basis of the initial signs of $X_i$ and $Y_i$, the direction of cut as supplied from the clockwise/counterclockwise storage 104 and the quadrant change signal from the zero detector 84.

The output of the half adder or subtracter 70 is also fed to the comparator 54 which continually compares the $X_i$ and $Y_i$ quantities, as modified, with the contents of the W2 and W3 word times of the register 50 which contains the $X_f$ and $Y_f$ quantities. This comparison is made for both quantity and sign and when both units compare in both quantity and sign, the comparator 54 sends a signal to the control logic box 62 which halts the cut and transfers the next block of information from temporary storage to active storage.

*Pulse Multiplication*

The output pulses from the command pulse detector 86, whether they be from a block of circular interpolation or linear interpolation pass to a pulse multiplier unit 110. The function of the pulse multiplier unit 110 is to provide either 1, 2, or 4 output pulses spread over a given recirculation cycle for each pulse from the command pulse detector which it receives. Whether the output constitutes 1, 2, or 4 pulses for each input pulse received is dependent upon the length of the feed rate number associated with that block of information. The feed rate number has a maximum of 13 digits. If it does contain 12 digits, the pulse multiplier provides four output pulses for each input pulse received. If the feed rate number contains 11 digits, the pulse multiplier provides two output pulses for each input pulse received. If the feed rate number contains 10 or fewer digits, the pulse multiplier provides one output pulse for each input pulse received.

The purpose of the pulse multiplier is to enable the preceding circuitry to operate at moderate speeds and yet provide a pulse output rate which is in excess of those speeds.

The pulse multiplier operates by sensing the length of the feed rate number as it is transferred from temporary to active storage through the gate 56. One of three combinations of flip-flops are set depending upon the length of the feed rate number. These condition gates allow 1, 2, or 4 output pulses to be provided in a recirculation cycle following the receipt of a pulse from the detector 86.

When the pulse multiplier circuitry is operative to provide a multiple output to the servo-mechanisms, the number of pulses dictated by the command numbers will be achieved proportionately more quickly and the pulse production process must be terminated proportionately sooner. This is done by making the zero detector 84 generate an end-of-cut signal for linear operation earlier than it would if no pulse multiplication were used. Accordingly, when there is no pulse multiplication, the end-of-cut signal is generated when there are zeros in the first 18 bit positions of the contents of the W2, W3, and W4 sections of the register 82. When pulse multiplication by 2 is commanded, zeros in the first 17 bit positions will signal end-of-cut. When pulse multiplication is by 4, the cut is ended when zeros occur in the first 16 bit positions. By this early termination, the command numbers are divided by 2 or 4 to compensate for the later multiplication. A maximum of two pulses may be lost to the servo-mechanism in this process and the machine accuracy is accordingly lowered.

This early termination process does not affect circular cuts which are terminated upon coincidence of modified $X_i$ and $Y_i$ with $X_f$ and $Y_f$, respectively.

*Output Servo*

The outputs of the pulse multiplier are then provided to servos which provide motion along the X, Y, and Z axes. These servos may be of the type which provide output motion at rates which are a linear function of the pulse input rate and move the output through distances defined by the total number of pulses received in the direction of the sign signal provided by the controller. Such servo systems will not be described in detail here. Servos which are applicable for use with the present system are disclosed in U.S. Patent No. 2,537,427 and U.S. patent application No. 661,952, filed May 25, 1957, now Patent No. 3,011,110, and assigned to the assignee of the present application among others.

Having thus described our invention, we claim:

1. An electronic system for receiving numerical data and for supplying pulse trains to each of a plurality of servo-mechanisms operative to simultaneously move a common member along a plurality of non-coincident axes, each of said servo-mechanisms being responsive to its pulse train so as to move the member through a distance proportional to a number of pulses in said train at a rate proportional to the instantaneous density of said pulses in said train, said numerical information containing a plurality of blocks each associated with a particular motion of said member, said blocks being divided into two types, linear and circular, the block type being represented by a coded symbol contained in said block, each block associated with a linear symbol containing a plurality of numbers which represent the distances of the end point of the path represented by said block from the position of the member immediately previous to the utilization of said block of information by the system, each block of information associated with a circular type cut containing two sets of numbers, each set representing the coordinates of one end point of a circular arc to be followed by the member with respect to the center of the circle, each block of information further including a number proportional to the rate at which the member is to follow the path indicated by such block, said system including a temporary storage unit including a plurality of temporary storage registers and a decoder including an adder, said decoder being operative, in association with the adder, to convert the information on the tape into a form proper for use in the subsequent circuitry; an active feed rate storage register for a number associated with the rate of motion; a feed rate summation storage register; means for repeatedly adding the contents of said feed rate storage register into said feed rate summation register operative to generate a signal each time an overflow occurs from the most significant position of said summation register following an addition; a plurality of command active storage registers operative to receive the number associated with the termination point of the line for a linear block of information and beginning point of the circular arc for a circular block of information; a plurality of command summation registers; means for adding the contents of active command storage registers into said command summation registers upon the generation of a signal indicating an overflow from said feed rate summation register; means for delivering an integral number of pulses to one of said servo-mechanisms upon the occurrence of an overflow from a command summation register associated with that servo-mechanism following an addition into such register; means operative during utilization of a block of information in the active circuitry associated with a linear motion of said member to terminate both addition processes upon the occurrence of a unique state in said command summation register; means operative during the utilization of a block of information associated with a circular cut in said active circuitry to modify the contents of one of said command active storage registers upon the occurrence of an overflow from the most significant state of one of the command summation registers; and means operative during the utilization of a circular block of information in said active circuitry to terminate both addition processes upon the numbers in said command storage registers being modified so as to be equal to the coordinates of the termination point of the circular arc that the member is to follow.

2. An electronic system having at its input coded numerical information and being operative to provide a plurality of trains of pulses to a number of servo-mechanisms which are operative to simultaneously move a member along mutually perpendicular paths, said numerical data comprising a plurality of blocks of information, each specifying a particular motion of said member, at least certain of said blocks being intended to produce a linear motion of said member and containing a plurality of numbers which represent the distances along the coordinate axes that said servo-mechanisms move in, from the position of the member previous to the utilization of such block of information to the desired position of said member subsequent to the utilization of said block of information, such block further containing a number proportional to the rate at which it is desired to move said member along its path, said system including an input unit operative to receive said numerical information, to establish electrical representations of said information, and to temporarily store that information; a feed rate active storage register operative to receive electrical representations from said input unit proportional to number in the block being utilized representing the rate at which the motion of the member along the path is to occur and to store said electrical representations; a feed rate summation register; means for repeatedly adding the contents of said feed rate active storage register into said feed rate summation register to produce an output signal each time an overflow is generated from the most significant stage of said feed rate summation register following an addition into it; a plurality of command number storage registers operative to receive from said input section electrical representations proportional to the coordinates of end point motion associated with a particular block of information; a plurality of command summation registers equal in number to said command storage registers each associated with a particular servo-mechanism; means for adding the contents of said feed rate storage registers into said feed rate summation registers upon the occurrence of an output signal from said means for detecting overflows from said feed rate summation register; means for transmitting one or more pulses to a servo-mechanism associated with a particular command number summation register upon the generation of an overflow from the most significant stage of such command summation register following an addition into such register; and means for terminating the adidtion process upon the occurrence of a unique state of said command number summation registers, such unique state being the same for all blocks of information commonding a linear motion.

3. An electronic system having as its input coded numerical information and being operative to provide a plurality of trains of pulses to a number of servo-mechanisms which are operative to simultaneously move a member along mutually perpendicular paths, said numerical data comprising a plurality of blocks of information, each specifying a particular motion of said member, at least certain of said blocks being intended to produce a linear motion of said member and containing a plurality of numbers which represent the distances along the coordinate axes that said servo-mechanisms move in, from the position of the member previous to the utilization of such block of information to the desired position of said member subsequent to the utilization of said block of information, such block further containing a number proportional to the rate at which it is desired to move said member along its path, said system including an input unit operative to receive said numerical information, to establish electrical representations of said information, and to temporarily store that information; a feed rate active storage register operative to receive electrical representations from said input unit proportional to a number in the block being utilized representing the rate at which the motion of the member along the path is to occur and to store said electrical representations; a feed rate summation register; means for repeatedly adding the contents of said feed rate active storage register into said feed rate summation register to produce an output signal each time an overflow is generated from the most significant stage of said feed rate summation register following an addition into it; a plurality of command number storage registers operative to receive from said input section electrical representations proportional to the coordinates of end point motion associated with a particular block of information; a plurality of command summation registers equal in number to said command storage registers each associated with a particular servo-mechanism; means for adding the contents of said feed rate storage registers into said feed rate summation registers upon the occurrence of an output signal from said means for detecting overflows from said feed rate summation register; means for transmitting one or more pulses to a servo-mechanism associated with a particular command number summation register upon the generation of an overflow from the most significant stage of such command summation register following an addition into such register; and means for terminating the addition process upon the occurrence of a unique state of said command number summation registers, such unique state being a function of the magnitude of said number representing the rate at which the motion of the member along the path is to occur.

4. A system having as its input coded numerical information and providing as its output pulse trains to a plurality of servo-mechanisms which are adapted to simultaneously provide motion of a member with respect to a tool along mutually perpendicular axes, such numerical data including a plurality of blocks of information, each block being associated with a particular motion to be performed by said member, at least certain of said blocks being related to a circular motion of said member and including two sets of numbers which represent the coordinates of the two end points of the circular path with respect to the center of such circle such block containing a number representing the rate of motion of said member along such circular path, such system including an input section operative to receive numerical data and establish electrical representations of such data in a form appropriate for use in the subsequent circuitry; an active feed rate storage register for receiving from the input circuit electrical representations proportional to the number representing the desired rate of motion of said member; a feed rate summation register; means for repeatedly adding the contents of said feed rate storage register into said feed rate summation register and to generate output signals upon the occurrence of an overflow in the most significant stage of such summation register; a plurality of coordinate storage registers operative to receive electrical representations derived from the initial point coordinates of said circle; a plurality of coordinate summation registers each associated with a particular servo-mechanism; means for adding the contents of said coordinate storage registers into said coordinate feed rate registers upon the occurrence of an output signal from the means for detecting the overflow of the feed rate summation register; means for transmitting pulse to the servo-mechanism associated with a particular coordinate summation register upon the generation of an overflow from the most significant stage of such register; means for modifying the electrical representation of the coordinate number contained in the coordinate storage register associated with a particular coordinate summation register upon the occurrence of an overflow from the most significant stage of another register; means for comparing the modified contents of said coordinate storage register with electrical representations of terminal points of the circular motion commanded by a particular information block and for terminating both addition processes upon such number being in coincidence; means for inspecting the contents of said coordinate storage registers and for changing the nature of the modification process to said numbers and the direction of motion of at least one of said servo-mechanisms upon the electrical representation in any of said coordinate storage registers being the electrical equivalent of a zero number.

5. An electronic system for use with servo-mechanisms, said system being operative to receive numerical data including blocks of information associated with particular paths to be followed by said servo-mechanisms, each block containing at least two numbers representing coordinates of a point on said path taken along the axes which said servo-mechanisms may move and a code signal representing the nature of such path, either linear or non-linear, said system being operative to generate pulse trains equal in number to said servo-mechanisms, each train containing a number of pulses proportional to the path distance along a particular coordinate, such pulses occurring at instantaneous rates which are proportional to the necessary motion rate of the associated servo-mechanisms at that instant, said system including: first registers, equal in number to said servo-mechanisms and operative to store said numbers; an adder; second summation registers equal in number to said servo-mechanisms; and a control unit operative to initially store said numbers in said first registers, repeatedly add the contents of said first registers into said second registers; means operative to generate a pulse in a particular pulse train when overflow occurs from the most significant stage of one of said second registers following addition into that register, and means operative to terminate the addition operation upon the occurrence of a particular predetermined condition in said second registers for a block of information containing a linear code number and to modify the contents of one of said first registers each time a pulse is generated in one of said pulse trains and to terminate the operation upon the occurrence of a predetermined condition in said first registers for a block of information containing a linear code number, such predetermined condition of said first registers being introduced into the system from said block of information.

6. A system operative to receive coded numerical information and to provide pulse trains to each of a first plurality of servo-mechanisms which are operative to move a common member simultaneously along a first plurality of coordinates, such numerical information including a second plurality of numbers which is not greater than said first plurality, such numbers representing the distances of a particular point on a curve to be followed by said member from a set of coordinate axes, such system including: a first plurality of first registers one associated with each of said servo-mechanisms; an adder; a first plurality of second registers each associated with one of said servo-mechanisms; and a control for said system operative to initially store said first numbers in said first registers, to repeatedly add the contents of said first registers into said second registers, to deliver a pulse to one of said servo-mechanisms upon the occurrence of an overflow from the most significant stage of the second register associated with said servo-mechanism following an addition into such second register, and to terminate said addition process upon the occurrence of a number of pulses of each of said trains sufficient to cause said servo-mechanism to move through a distance equal to its coordinate contribution to the path being generated.

7. A system operative to receive coded numerical information and to supply pulse trains to each of a plurality of servo-mechanisms which provide motion along a number of paths equal to the servo-mechanisms simultaneously, said numerical information including a plurality of blocks of information each associated with a particular path to be followed by said servo-mechanism, at least certain of said blocks containing at least two numbers which represent the coordinates of the end point of a particular path to be followed with respect to the axes of said various servo-mechanisms and such coordinates being taken with respect to the position of said member prior to the utilization of such block of information, said system including: a plurality of first registers equal in number to said servo-mechanisms; an adder; a plurality of second summation registers equal in number to said first registers; and a control operative to repeatedly add the contents of said first registers into said second registers, to deliver a pulse to one of said servo-mechanisms upon the occurrence of an overflow from the second register associated with such servo-mechanism, and to terminate the addition process upon the occurrence of an unique state in said second registers.

8. A system operative to receive coded numerical information and to provide pulse trains to each of a first plurality of servo-mechanisms which are operative to move a common member simultaneously along a first plurality of coordinates, such numerical information including a second plurality of numbers which is not greater than said first plurality, such numbers representing the distances of a particular point on a curve to be followed by said member from a set of coordinate axes, such system including: a first plurality of first registers one associated with each of said servo-mechanisms; an adder; a first plurality of second registers each associated with one of said servo-mechanisms; and a control for said system operative to initially store said first numbers in said first registers, to repeatedly add the contents of said first registers into said second registers, to deliver a pulse to one of said servo-mechanisms upon the occurrence of an overflow from the most significant stage of the second register associated with said servo-mechanism following an addition into such second register, and to terminate said addition process upon the occurrence of an unique state in said second registers.

9. A system operative to receive coded numerical information and to provide pulse trains to each of a plurality of servo-mechanisms which provide simultaneous motion along different coordinates, the data including a plurality of blocks of information, each block containing information relating to a path to be followed by servo-mechanisms, said information including at least two numbers representing coordinates of a point on said path and a code sign indicating the nature of the path, either linear or non-linear, said system including: a plurality of first register sections equal in number to said servo-mechanisms and operative to receive said numbers; an adder; a plurality of second summation register sections; and a control for said system operative to repeatedly add the contents of said first register sections into said second register sections, to generate a pulse in the train to one of said servo-mechanisms when an overflow occurs in the most significant stage of one of said second register sections upon addition into such register section, to halt said addition process for a block associated with the linear motion upon the occurrence of an unique state in said second register sections, and to halt the addition process for a block associated with a non-linear motion upon the occurrence of a predetermined state in said second register sections, the nature of said predetermined state being contained in said block of information.

10. An electronic system for use with servo-mechanisms, said system being operative to receive numerical data including blocks of information associated with particular paths to be followed by said servo-mechanisms, each block containing at least two numbers representing coordinates of a point on said path taken along the axes which said servo-mechanisms may move and a code signal representing the nature of such path, either linear on non-linear, said system being operative to generate pulse trains equal in number to said servo-mechanisms, each train containing a number of pulses proportional to the path distance along a particular coordinate, such pulses occurring at instantaneous rates which are proportional to the necessary motion rate of the associated servo-mechanisms at that instant, said system including: first registers, equal in number to said servo-mechanisms and operative to store said numbers; an adder; second summation registers equal in number to said servo-mechanisms; and a control unit operative to initially store said numbers in said first registers, repeatedly add the contents of said first registers into said second registers; and means operative to generate a pulse in a particular pulse train when overflow occurs from the most significant stage of one of said second registers following addition into that register.

11. A system for controlling the motion of a machine operative to receive numerical information relating to a particular motion and containing at least two numbers which constitute distances along separate coordinate axes and information indicating whether the curve that such numbers relate to is linear or non-linear, and to generate trains of pulses equal in number to said axes each pulse in said trains being operative to cause movement an incremental distance along the axis with which said train is associated, including: first registers for storing said numbers; an adder; summation registers equal in number to said axes; and a control system operative to repeatedly add the contents of said first registers into said summation registers, to generate pulses in said trains upon the occurrence of an overflow from most significant stage of any of said summation registers, to modify the contents of said first registers upon the generation of a pulse in the event that the curve with which said numbers are associated is non-linear, and to terminate said addition upon the attaining of a certain condition programmed in the system through said numerical information, depending upon whether the curve is linear or non-linear respectively.

12. An electronic system for controlling motion having as its input numerical data and providing output to a plurality of servo-mechanisms, said data including a plurality of blocks of information each relating to a particular motion to be achieved by said servo-mechanisms each block including a plurality of numbers representing distances along the axes controlled by said servo-mechanisms from a particular point on a path to be followed by said servo-mechanisms to a reference point, which varies from block to block, said system including: first registers for receiving said numbers; an adder; summation registers equal in number to said servo-mechanisms; and a control system operative to repeatedly add the contents of said first registers into said summation registers, to provide at least one pulse to one of the servo-mechanisms upon the occurrence of an overflow from the most significant stage of a summation register, and to terminate said addition when a sufficient number of pulses have been generated in each train to achieve the motion dictated by the block of information.

13. An electronic system operative to receive numerical data including at least a first plurality of numbers representative of distances along mutually perpendicular axes and a signal indicating whether a curve which said numbers relate to is linear or non-linear and to generate a first plurality of trains of pulses, including: first registers operative to receive said numbers; an adder; a first plurality of second summation registers; and a control system operative to repeatedly add the contents of said first registers into said summation registers, to repeatedly modify the contents of said first registers in the event that the curve said numbers refer to is non-linear, and to generate a first plurality of trains of pulses under control of the overflows from said summation registers.

14. A system operative to receive numerical data including a plurality of commands representing distances along various coordinates and to generate a plurality of pulse trains equal in number to said commands, each containing a number of pulses which is proportional to one of the distances, said pulses in the various trains occurring at rates which are in the same ratio as the distances, said system including: means for storing the numerical representations of the command numbers; an adder; a summation register; and a control operative to repeatedly add said command numbers to separate sections of said summation register to generate at least one pulse in one of said pulse trains upon a generation of an overflow from a section of said summation register associated with said pulse train, and to terminate the addition process upon the occurrence of the proper number of pulses in each of said trains.

15. A system operative to receive numerical data including data including at least two numbers representative of distances along mutually perpendicular axes and to generate trains of pulses equal in number to said number of axes, said system including: first registers to retain said numbers; an adder; summation registers equal in number to said axes; and a control operative to cause the contents of said first registers to be repeatedly added into said summation registers, to generate a pulse each time an overflow occurs from the most significant digit of one of said summation registers, and to terminate the addition process upon the occurrence of a unique condition in at least one of said summation registers.

16. A system operative to receive numerical data including data including at least two numbers representative of distances along mutually perpendicular axes and to generate trains of pulses equal in number to said number of axes, said system including: first registers to retain said numbers; an adder; summation registers equal in number to said axes; and a control operative to cause the contents of said first registers to be repeatedly added into said summation registers, to generate a pulse each time an overflow occurs from the most significant stage of one of summation registers, and to terminate the addition process upon the occurrence of zeros in a number of stages of summation registers equal to the number of digits in said numbers less one.

17. A system operative to receive numerical data including at least two numbers representative of distances along mutually perpendicular axes and to generate trains of pulses equal in number to said number of axes, said system including: means for operating upon said numbers so as to form modified numbers which are odd; first registers to retain such modified numbers; an adder; summation registers equal in number to said axes; and a control operative to cause the contents of said first registers to be repeatedly added into said summation registers, to generate a pulse each time an overflow occurs from the most significant digit of one of said summation registers, and to terminate the addition process upon the occurrence of zeros in all stages of the summation registers with the exception of the most significant stage.

18. An electronic system operative to receive numerical data including at least a first plurality of numbers representative of distances along mutually perpendicular axes, a signal indicating whether a curve which said numbers relate to is linear or non-linear, and a set of numbers useful for the termination process in the event the curve is non-linear, and to generate a first plurality of trains of pulses, including: first registers operative to receive said numbers; an adder; a first plurality of second summation registers; and a control system operative to repeatedly add the contents of said first registers into said summation registers, to generate an output pulse in one of said trains upon the occurrence of an overflow from the most significant stage of one of said summation registers, to modify the contents of one of said first registers upon the occurrence of an overflow from the most significant stage of the summation register associated with that register in the event that the curve of said number referred to is non-linear, to terminate the addition process upon coincidence because the numbers contained in said first registers and a set of numbers which relate to the termination process in the event the curve is non-linear, and to terminate the addition process upon the occurrence of a unique condition in said summation registers in the event the curve is linear.

References Cited in the file of this patent

UNITED STATES PATENTS

| | | |
|---|---|---|
| 2,436,178 | Rajchman | Feb. 17, 1948 |
| 2,873,074 | Harris et al. | Feb. 10, 1959 |